United States Patent
Jaber et al.

(10) Patent No.: US 9,650,131 B2
(45) Date of Patent: May 16, 2017

(54) METHOD FOR ROTATIONALLY DRIVING AN AIRCRAFT WHEEL

(71) Applicant: MESSIER-BUGATTI-DOWTY, Velizy Villacoublay (FR)

(72) Inventors: Sylvain Jaber, Velizy-Villacoublay (FR); Raffi Cekic, Velizy-Villacoublay (FR)

(73) Assignee: MESSIER-BUGATTI-DOWTY, Velizy Villacoublay (FR)

(*) Notice: Subject to any disclaimer, the term of this patent is extended or adjusted under 35 U.S.C. 154(b) by 0 days.

(21) Appl. No.: 14/817,295

(22) Filed: Aug. 4, 2015

(65) Prior Publication Data
US 2016/0039518 A1    Feb. 11, 2016

(30) Foreign Application Priority Data
Aug. 5, 2014   (FR) .................................... 14 57612

(51) Int. Cl.
| | | |
|---|---|---|
| B60K 1/00 | (2006.01) | |
| B64C 25/40 | (2006.01) | |
| B60B 3/08 | (2006.01) | |
| B60B 37/10 | (2006.01) | |
| B60B 25/00 | (2006.01) | |

(52) U.S. Cl.
CPC ............. *B64C 25/405* (2013.01); *B60B 3/08* (2013.01); *B60B 25/004* (2013.01); *B60B 37/10* (2013.01); *B60Y 2200/51* (2013.01); *Y02T 50/823* (2013.01)

(58) Field of Classification Search
CPC .......... B60K 7/0007; B60K 2007/0092; B64C 25/405

USPC ......................................... 180/65.51; 244/50
See application file for complete search history.

(56) References Cited

U.S. PATENT DOCUMENTS

| | | | | | |
|---|---|---|---|---|---|
| 2,505,770 | A | * | 5/1950 | Hill .......................... | B64C 25/40 244/103 S |
| 3,762,670 | A | * | 10/1973 | Chillson .................. | B64C 25/36 180/301 |
| 3,792,742 | A | * | 2/1974 | Mager .................. | B60L 11/1805 180/65.51 |
| 3,850,389 | A | * | 11/1974 | Dixon .................... | B64C 25/405 244/103 S |
| 7,445,178 | B2 | * | 11/2008 | McCoskey ............... | B64F 1/32 244/100 R |
| 8,556,210 | B2 | * | 10/2013 | Farid ..................... | B60T 13/741 244/103 R |
| 8,857,544 | B2 | * | 10/2014 | Essinger ............... | B64C 25/405 180/65.51 |
| 9,290,264 | B2 | * | 3/2016 | Charles ................. | B64C 25/405 |

(Continued)

FOREIGN PATENT DOCUMENTS

| | | |
|---|---|---|
| DE | 43 41 913 A1 | 6/1995 |
| EP | 2 447 154 A2 | 5/2012 |
| GB | 1 213 862 A | 11/1970 |

OTHER PUBLICATIONS

French Search Report of FR 14 57612 dated Mar. 24, 2015.

*Primary Examiner* — Jeffrey J Restifo
(74) *Attorney, Agent, or Firm* — Sughrue Mion, PLLC

(57) ABSTRACT

A method for rotationally driving an aircraft wheel, the wheel being equipped with a rim comprising two half-rims assembled by bolts (5). According to the method, a drive member for generating a torque for driving the wheel is controlled. The transfer of the drive torque to the wheel is accomplished via the rim assembly bolts.

2 Claims, 3 Drawing Sheets

(56) References Cited

U.S. PATENT DOCUMENTS

| | | | |
|---|---|---|---|
| 2007/0181357 A1* | 8/2007 | Saito | B60K 7/0007 180/65.51 |
| 2008/0202832 A1* | 8/2008 | Ai | B60K 7/0007 180/65.51 |
| 2009/0314562 A1* | 12/2009 | Soderberg | B64C 25/36 180/65.51 |
| 2010/0163323 A1* | 7/2010 | Pickholz | B60K 7/0007 180/65.51 |
| 2011/0139523 A1* | 6/2011 | Chen | B60K 7/0007 180/65.51 |
| 2011/0168464 A1* | 7/2011 | Scheuerman | B60L 11/18 180/65.51 |
| 2012/0153075 A1* | 6/2012 | Wilson | B64C 25/405 244/50 |
| 2012/0228921 A1* | 9/2012 | Essinger | B64C 25/405 301/6.2 |
| 2013/0200210 A1* | 8/2013 | Oswald | B64C 25/405 244/50 |
| 2014/0284122 A1* | 9/2014 | Hirata | B60G 3/20 180/65.51 |
| 2014/0353056 A1* | 12/2014 | Hirano | B60K 7/0007 180/65.51 |
| 2015/0097078 A1* | 4/2015 | Mueller | B64C 25/405 244/50 |
| 2015/0158579 A1* | 6/2015 | Cox | B64C 25/405 244/50 |
| 2015/0314862 A1* | 11/2015 | Blanc | B64C 25/405 244/103 S |
| 2015/0321751 A1* | 11/2015 | Mazarguil | B64C 25/34 301/6.2 |
| 2015/0336660 A1* | 11/2015 | Edelson | H02K 5/225 244/50 |
| 2016/0039518 A1* | 2/2016 | Jaber | B60B 3/08 301/6.2 |

* cited by examiner

METHOD FOR ROTATIONALLY DRIVING AN AIRCRAFT WHEEL

The invention relates to a method for rotationally driving an aircraft wheel.

TECHNOLOGICAL BACKGROUND OF THE INVENTION

It is increasingly envisaged to equip aircraft with members for rotationally driving the wheels which allow the aircraft to move while its power plants are inactive. In general, the drive member comprises an electric motor combined with a reduction gear and equipped with an output pinion which cooperates with a driving ring secured to the rim of the wheel. However, securing the ring to the rim requires the provision on the latter of specific clevises around the periphery thereof, which entails that specific rims must be produced. Most often, with the rims of aircraft wheels of a certain size, the rims comprise two half-rims assembled together by a series of bolts.

SUBJECT OF THE INVENTION

The subject of the invention is a method for rotationally driving an aircraft wheel by means which require little or no modification of the existing rims.

PRESENTATION OF THE INVENTION

For the purpose of achieving this objective, there is proposed a method for rotationally driving an aircraft wheel, the wheel being equipped with a rim comprising two half-rims assembled by bolts, in which method a drive member for generating a torque for driving the wheel is controlled. According to the invention, the drive torque is transferred to the wheel via the rim assembly bolts.

Thus, the torque is transferred to the wheel by the rim assembly bolts, which, moreover, does not require modifying the half-rims. All that is required is to adapt the bolts or to provide drive member output interfaces capable of being adapted to the said bolts in order to drive the wheel provided with its customary rim.

According to a preferred embodiment, a coupling ring is arranged between a rotor of a motor of the drive member and the bolts of the rim. The coupling ring serves both to transmit the torque and to damp transmission jolts.

PRESENTATION OF THE FIGURES

DETAILED DESCRIPTION OF AN EMBODIMENT OF THE INVENTION

Figure 1:
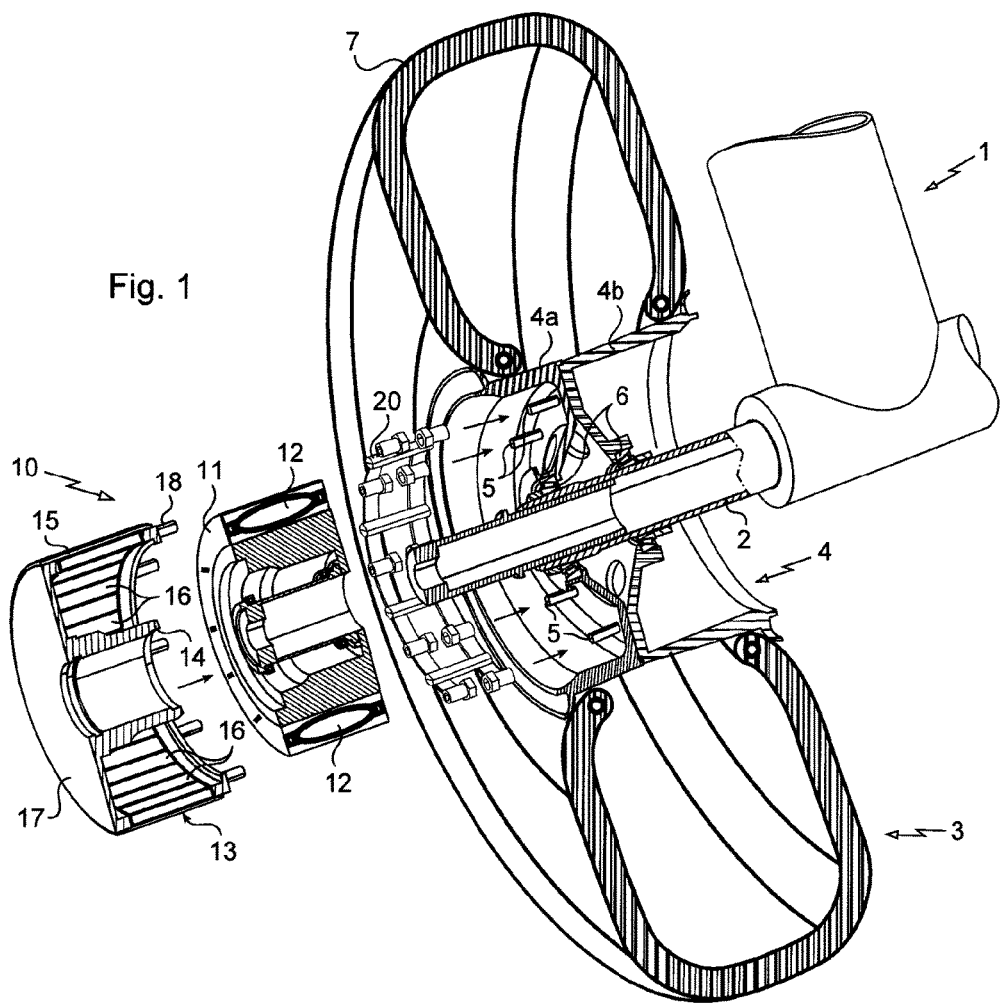
FIG. 1 is an exploded perspective view of the bottom of an aircraft landing gear equipped with a rotational drive member coupled to the adjacent wheel by means of the method of the invention.

With reference to FIG. 1, the method of the invention is here implemented on a landing gear 1 of which there can be seen here the lower part equipped with an axle 2 on which a wheel 3 is mounted to rotate. The wheel comprises a rim 4 formed by two half-rims 4a, 4b assembled by bolts 5 each comprising a screw and an associated nut. The rim 4 is guided in rotation on the axle 2 by means of bearings 6, and bears a tyre 7. The landing gear is equipped with a member for rotationally driving the wheel 3 that essentially comprises an electric motor 10 mounted at the end of the axle 2. The motor 10 comprises a stator 11 which is directly fixed to the axle 2. The stator bears coils 12 at its periphery. The motor 10 also comprises a rotor 13 which comprises a hub 14 rotatably mounted on the stator, here by means of bearings. The rotor 13 comprises a drum 15 which extends around the stator and which bears permanent magnets 16. The drum 15 is connected to the hub 14 by a flange 17 which also serves as a protective cap for the motor 10. The circulation of a current in the coils which is adapted to create a rotating magnetic field induces in the drum a mechanical torque which rotationally drives the drum. When the motor 10 is in position on the axle 2, the axis of rotation of the rotor 13 is coincident with the axis of rotation of the wheel 3. The drum 15 bears a plurality of tie rods 18 which extend parallel to the axis of rotation of the rotor 13, substantially opposite the bolts 5. The drum thus forms the output member of the drive member.

Figure 2:
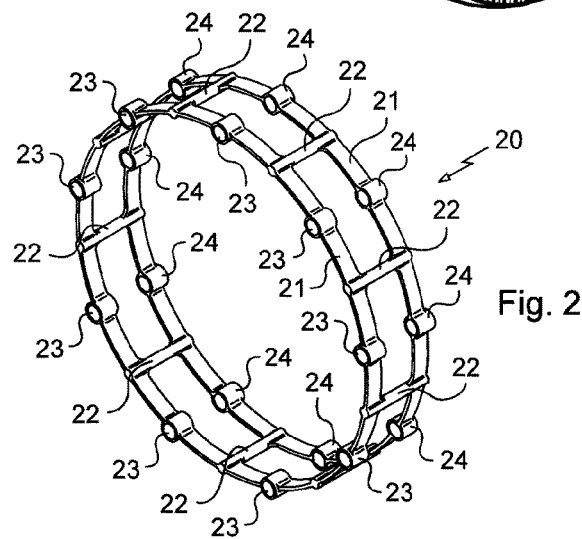
FIG. 2 is a perspective view of the interfacing member extending between the drive member and the rim of the wheel.
Figure 3:
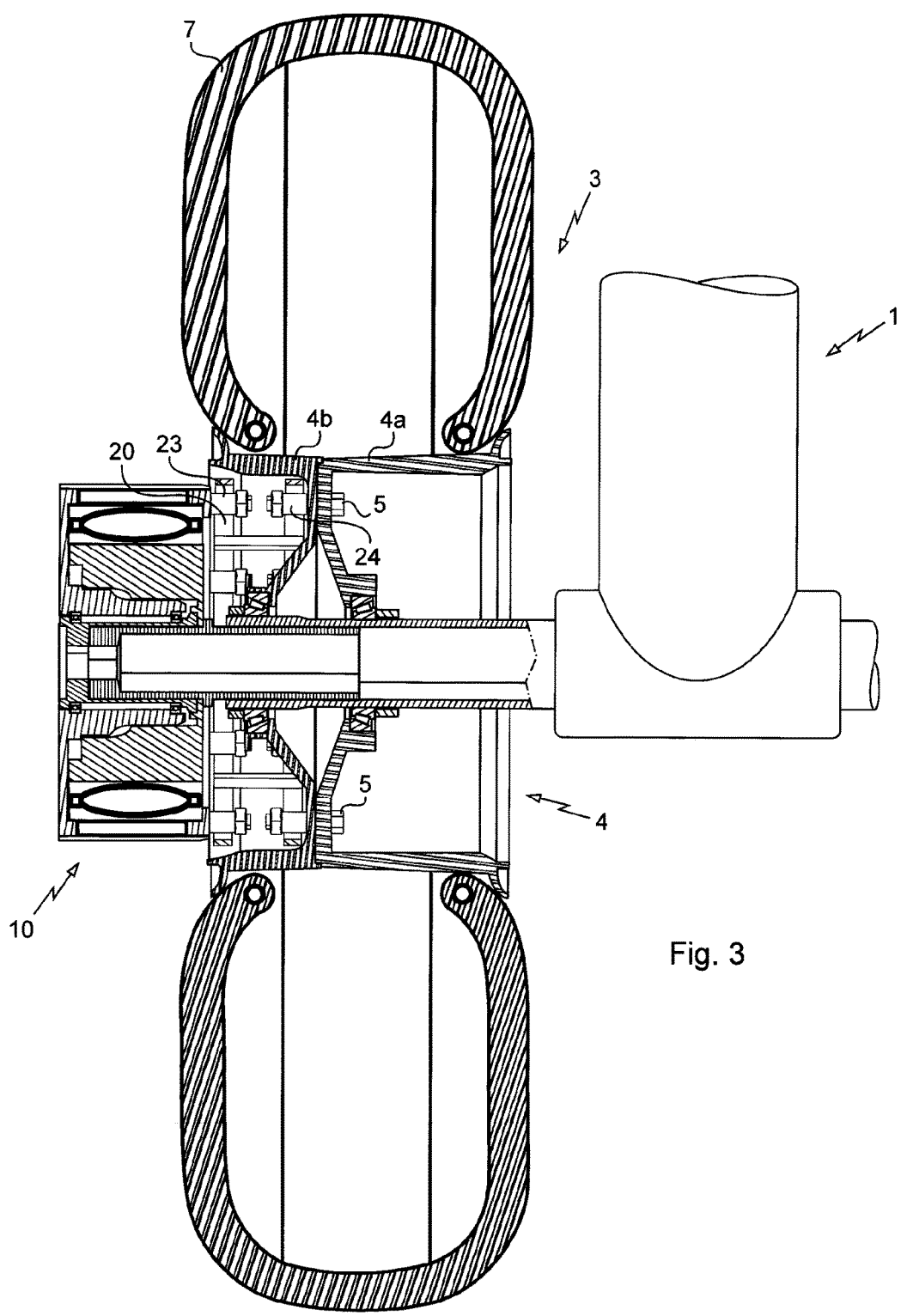
FIG. 3 is a view in section of the landing gear of FIG. 1.

An interfacing member 20 extends between the tie rods 18 and the bolts 5 in order to connect in rotation the drum 15 of the rotor 13 and the wheel 3. As can be seen more particularly in FIG. 2, the interfacing member 20 comprises two coaxial rings 21 connected by crossmembers 22. Each ring 21 bears a plurality of sleeves 23 and 24 adapted to respectively receive the ends of the tie rods 18 and screws of the bolts 5, as can be seen in FIG. 3. Nuts are then fitted on each tie rod and each screw to secure the interfacing member 20.

Thus, the bolts 5 clamp the two half-rims and the sleeves 24 of the interfacing member 20.

The interfacing member 20 makes it possible to transmit the torque of the rotor 13 to the wheel 3 in order to rotationally drive the latter. It will be noted that its structure is deliberately flexible to allow it to absorb the transmission jolts and the relative movements between the wheel 3 and the rotor 13 due in particular to the bending of the axle and the deformation of the rim during the taxiing of the aircraft.

The torque of the motor 10 is thus transmitted to the wheel 3 via the bolts 5 which connect the half-rims 4a, 4b to one another. Thus, it is possible to use half-rims without any modification, the half-rims being widely dimensioned in order to receive the torque via the assembly bolts. All that will be required is to choose screws which are slightly longer than the customary screws and also appropriate nuts in order to facilitate interfacing with the drive member.

Figure 4:
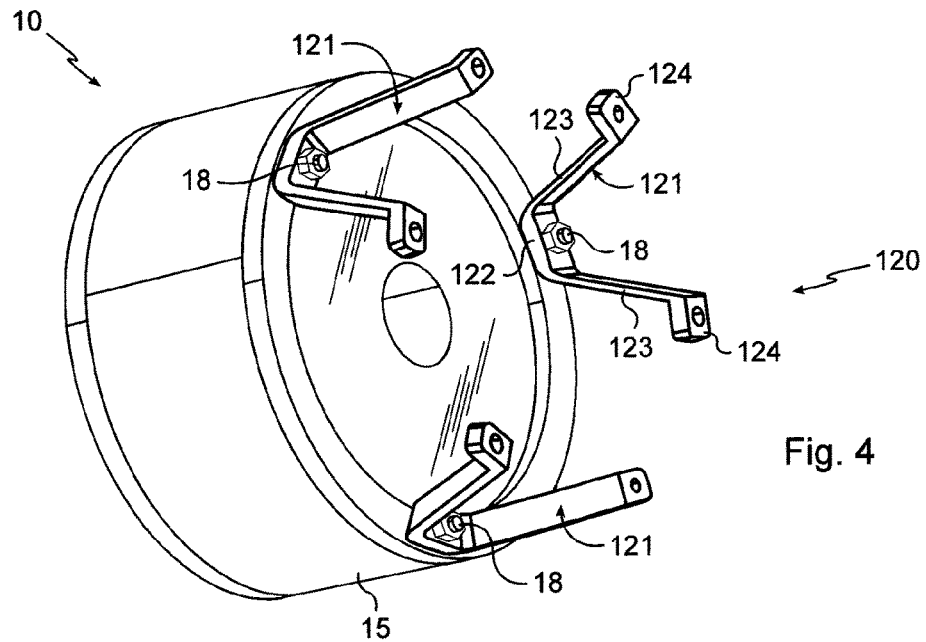
FIG. 4 is a perspective view of a drive member provided with an interfacing member for transmitting the torque via the wheel rim assembly bolts according to a variant embodiment of the invention.
Figure 5:
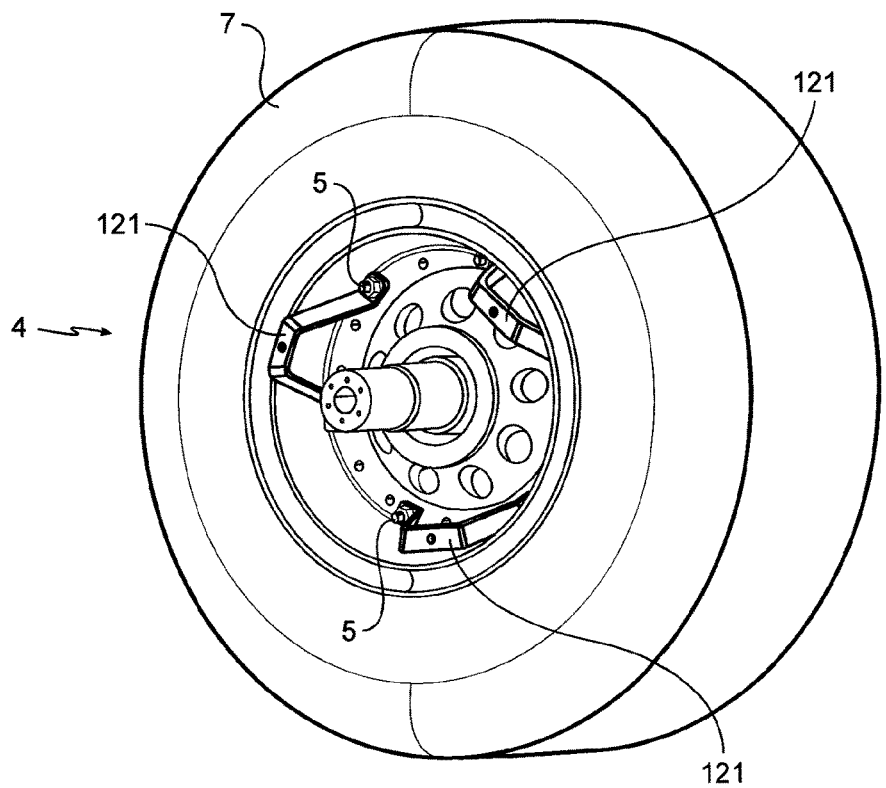
FIG. 5 is a perspective view of an aircraft wheel equipped with the interfacing member of FIG. 4.

According to a variant of the invention illustrated in FIGS. 4 and 5, the interfacing member 120 here comprises three stirrups 121 each comprising a bridge 122 connecting two arms 123 terminated by lugs 124. The lugs 124 are attached to the rim 4 by means of the assembly bolts 5 and are fixed to the rotor 13 by the tie rods 18. The rotor is thus connected to the rim via the interfacing member 120 which transmits the torque of the motor via the rim assembly bolts. It will be noted that the stirrups can be mounted in the other direction, the lugs being fixed to the rotor while the bridge is fixed to the rim.

The invention is not limited to what has been described, but encompasses any variant coming within the scope defined by the claims. In particular, although in the illustrated example the drive member is placed towards the exterior of the rim such that the interior is free to receive brake discs, the drive member may be placed towards the interior of the rim while being interfaced with the wheel by its assembly bolts.

Although here the rotor of the motor of the drive member is directly interfaced to the bolts of the rim so as to be in direct engagement with the wheel, it will of course be possible to interpose a reduction gear, for example of the epicyclic type, of which the output member will be interfaced to the bolts of the rim.

Finally, any other type of interface may be envisaged between the output of the drive member and the rim assembly bolts. In particular, the output of the drive member may be provided with simple orifices able to receive the ends of the screws of the rim assembly bolts such that demounting of the drive member does not require an uncoupling operation between the drive member and the wheel.

The invention claimed is:

1. A method for rotationally driving an aircraft wheel, the wheel being equipped with a rim comprising two half-rims assembled by bolts (5), comprising:
  controlling a drive member for generating a torque for driving the wheel, and
  transferring the drive torque to the wheel via the rim assembly bolts by means of a drive member which comprises a motor (10) having an output member (15) forming part of a rotor of the motor (10) mounted coaxially to the wheel, the output member being connected to the rim assembly bolts (5) by an interfacing member (20; 120),
  wherein the interfacing member (20) comprises two coaxial rings (21) connected to one another by cross-members (22), each ring comprising sleeves for receiving ends of the rim assembly bolts (5) and ends of tie rods secured to the output member (15).

2. A method for rotationally driving an aircraft wheel, the wheel being equipped with a rim comprising two half-rims assembled by bolts (5), comprising:
  controlling a drive member for generating a torque for driving the wheel, and
  transferring the drive torque to the wheel via the rim assembly bolts by means of a drive member which comprises a motor (10) having an output member (15) forming part of a rotor of the motor (10) mounted coaxially to the wheel, the output member being connected to the rim assembly bolts (5) by an interfacing member (20; 120),
  wherein the interfacing member (120) comprises a plurality of stirrups (121) comprising two arms (123) connected by a bridge (122) and terminated by lugs (124), the bridge of each stirrup being fixed to the one of the output member or rim, the lugs being fixed to the other of the output member or rim.

* * * * *